United States Patent Office 3,272,834
Patented Sept. 13, 1966

3,272,834
DIISOPROPYL AMMONIUM NICOTINATE
Alfred Kraushaar and Kurt Riedl, Tyrol, Austria, assignors to Biochemie Gesellschaft mit beschrankter Haftung, Tyrol, Austria, a corporation of Austria
No Drawing. Filed Dec. 6, 1963, Ser. No. 328,515
Claims priority, application Austria, Dec. 14, 1962, A 9,797
1 Claim. (Cl. 260—295.5)

The present invention relates to a novel therapeutic agent and therapeutic compositions containing the novel agent.

The novel agent is the salt, diisopropylammonium nicotinate. The new salt forms white crystals which melt and decompose between 120 and 125° C. on the heated stage of a microscope. It has the molecular formula $C_{12}H_{20}O_2N_2$ and a molecular weight of 224.3.

It is known that nicotinic acid causes dilatation of the blood vessels, principally of the smaller arterioles. It is assumed that in the body nicotinic acid is converted into the amide which has a more powerful effect than the acid. Therapeutically nicotinic acid is used in the form either of its sodium salt or of its magnesium salt. In the human body intravenous injection produces a perceptible vascular reaction which manifests itself primarily in the peripheral regions of the organism, objectively recognisable by reddening of the skin of head, neck and extremities, and subjectively recognisable by an intense feeling of warmth.

Pharmacological experiments have shown that diisopropylammonium nicotinate produces effects which far exceed those produced by sodium nicotinate or even by nicotinamide.

The novel nicotinic acid ammonium nicotinate may be produced by reacting nicotinic acid or a salt, particularly a metal salt, thereof with diisopropylamine or a salt thereof. Salts of nicotinic acid which may be used include the sodium, potassium, ammonium and magnesium salts. Diisopropylammonium salts which may be used include the chloride, bromide, sulphate, oxalate and acetate. Preferably the reaction is performed in the presence of an organic solvent, desirably acetone, ethyl acetate or isobutyl acetate. However, water or an aqueous solvent may also be used, especially when reacting a water-soluble salt of nicotinic acid with a water-soluble salt of diisopropylamine.

Alternatively, the novel salt may be produced in a solvent in which at least one of the reactants is only partially soluble being present in the form of a suspension in the solvent. In this method of performing the invention the rate of reaction can be conveniently controlled by altering the solubility of the partially soluble reactant or reactants in the solvent, for instance by making additions which raise or lower the solubility or by raising or lowering the reaction temperature. If in this method of performing the reaction a solvent is used in which the diisopropylamine nicotinate formed is only partially soluble also and to a lesser extent than at least one of the original reactants, then the novel salt can be obtained by crystallization from the solvent in the form of crystals of particaularly uniform size and shape.

The following example further illustrates the process of the invention.

EXAMPLE 1

12.3 g. (0.1 mol) of nicotinic acid are suspended in 170 ml. of acetone in a round-bottomed flask of 250 ml. capacity. 12.1 g. of diisopropylamine (=20% excess) are added to the suspension. When refluxed on a water bath the nicotinic acid quickly dissolves. After filtering the solution through a pleated filter and allowing the solution to cool by standing it in an ice cabinet, large pure white crystals form. These are sucked off and dried in a desiccator.

Yield: 20.8 g. of diisopropylamine nicotinate (=92.7% of theory, related to the nicotinic acid); M.P. 120–125° C. (decomp., heated stage microscope).

Analysis. — Calculated: $C=64.25\%$, $H=8.99\%$. Found: $C=63.98\%$, $H=8.80\%$.

If ethyl acetate is used as the solvent a yield of 21.4 g. of diisopropylamine nicotinate (=95.4% of th.) is obtained, whereas in isobutyl acetate as the solvent the yield is 21.3 g. of diisopropylamine nicotinate (=94.9% of th.).

In an experiment to compare the effectiveness of the novel compound with that of sodium nicotinate and nicotinamide the three substances were intravenously injected into cats under an anaesthetic and the effects on blood pressure were observed with the aid of a mercury manometer tied into the arteria carotis dextra by means of a canule. The resultant reductions in blood pressure in mm. Hg are set out in the following table.

Table 1.—Reduction of blood pressure in anaesthetised cats

| Substance | Dosage in millimols/kg. body weight | Reduction of blood pressure in mm. Hg |
|---|---|---|
| Sodium nicotinate | 0.01 | 0 |
|  | 0.1 | 0 |
|  | 0.5 | 0 |
|  | 1.0 | 8–10 |
| Nicotinamide | 0.01 | 0 |
|  | 0.1 | 0 |
|  | 0.5 | 20 |
|  | 1.0 | 35 |
| Diisopropylammonium nicotinate | 0.01 | 60 |

From these experiments it will be seen that 1.0 millimol/kg. body weight of sodium nicotinate is required before a lowering in blood pressure is observable, whereas roughly twice the effect is achieved with only 0.5 millimol/kg. body weight of nicotinamide and as little as 0.01 millimol/kg. body weight of diisopropylammonium nicotinate has about twice the effect of 1.0 millimol/kg. body weight of nicotinamide. The dosage of the diisopropylammonium salt cannot be further increased because blood pressure cannot be reduced by more than 60 mm. Hg.

A well tried method of determining the peripheral vascular effect of a substance is to measure the body temperature drop in white mice. The lowering of body temperature is due to peripheral vascular dilatation with a consequent increase in blood flow through the skin and a greater dissipation of heat. Owing to the relatively large surface area of the body of a mouse this effect is clearly demonstrable in the case of all substances which cause vascular dilatation.

Table 2 shows the temperature reduction produced by the three substances compared with controls injected with a physiological solution of common salt.

*Table 2.—Maximum temperature reduction in white mice*

| Substance | Dosage in millimol/kg. body weight | Temperature reduction in ° C. | Number of animals |
|---|---|---|---|
| NaCl, control | | 0.4 | 35 |
| Na-nicotinate | 1 | 1.5 | 11 |
| | 2 | 1.0 | 12 |
| | 10 | 1.5 | 18 |
| Nicotinamide | 1 | 0.7 | 12 |
| | 2 | 1.1 | 12 |
| | 10 | 3.5 | 18 |
| Diisopropylammonium nicotinate | 1 | 4.0 | 11 |
| | 2 | 6.4 | 9 |

It is seen that within the limits of experimental error the effects of sodium nicotinate and of nicotinamide in this test were substantially the same up to a dosage of 2 millimols/kg. body weight, a dosage of as much as 10 millimols/kg. body weight being necessary before the two substances showed perceptible differences. On the other hand, the diisopropylamine salt in a quantity of 1 millimol/kg. body weight already had more pronounced effects than the two other substances at the maximum tested dosage. 2 millimols/kg. body weight lower the temperature by 6.4° C. so that higher dosages were not tried.

Therapeutic compositions containing the novel diisopropylamine nicotinate in admixture with conventional excipientia with or without other conventional ingredients can be produced by any usual pharmaceutical method for administration in any convenient manner. For instance, the active compound may be filled into ampoules for the injection. A typical ampoule may contain:

| | |
|---|---|
| Diisopropylammonium nitcotinate | mg__ 50.0 |
| Sodium citrate buffer, pH 6.4 | mg__ 10.8 |
| Aqua bidest | ml__ 2.0 |

Ampoule preparations of this kind are conveniently administered by injections of 1 ampoule once or twice daily intravenously or intramuscularly.

A typical recipe for tablets containing the novel active substance is

| | Mg. |
|---|---|
| Diisopropylamine nicotinate | 50.0 |
| Excipientia ad | 250.0 |

A suitable prescription for taking such tablets would be 1 to 2 tablets per day.

For dropwise administration one suitable preparation may be obtained by diluting the novel salt with conventional excipientia used in the production of drops to achieve a concentration of 50.0 mg. of diisopropylamine nicotinate in 20 drops (i.e. about 0.734 ml.). A suitable prescription for such drops would be 20 drops 3 times a day.

EXAMPLE 2

16.1 g. (0.1 mole) potassium nicotinate and 13.7 g. (0.1 mole) diisopropylamine hydrochloride (both substances in the form of a fine powder) are refluxed 2 hours in 150 ml. dry ethyl acetate. Thereafter the precipitation of the potassium salt is sucked off while hot (8.2 g. instead of 7.45 g. as calculated) and the filtrate is brought in an ice cabinet. After some hours the crystallized product is sucked off, washed with a little amount of cold ethyl acetate, and dried.

Yield: 19.0 g. (84.8% of theory). The decomposition melting point was as described in Example 1.

We claim:

Diisopropylammonium nicotinate.

References Cited by the Examiner

UNITED STATES PATENTS

| | | | |
|---|---|---|---|
| 2,476,464 | 7/1949 | Stiller | 260—295 |
| 2,507,468 | 5/1950 | Goggin | 167—65 |
| 2,516,153 | 7/1950 | Schwenk | 260—295 |
| 3,042,581 | 8/1964 | Debay et al. | 167—65 |

WALTER A. MODANCE, *Primary Examiner.*

ALAN L. ROTMAN, *Assistant Examiner.*